Dec. 22, 1964  S. E. FAREKAS  3,162,073
HALF-NUT CLOSING ARRANGEMENT
Filed Oct. 18, 1962  2 Sheets-Sheet 1

INVENTOR.
Stephen Emery Farekas
BY Walter J. Schlegel, Jr.
Atty.

Witness:
Robert A. Brown

Dec. 22, 1964  S. E. FAREKAS  3,162,073
HALF-NUT CLOSING ARRANGEMENT
Filed Oct. 18, 1962  2 Sheets-Sheet 2
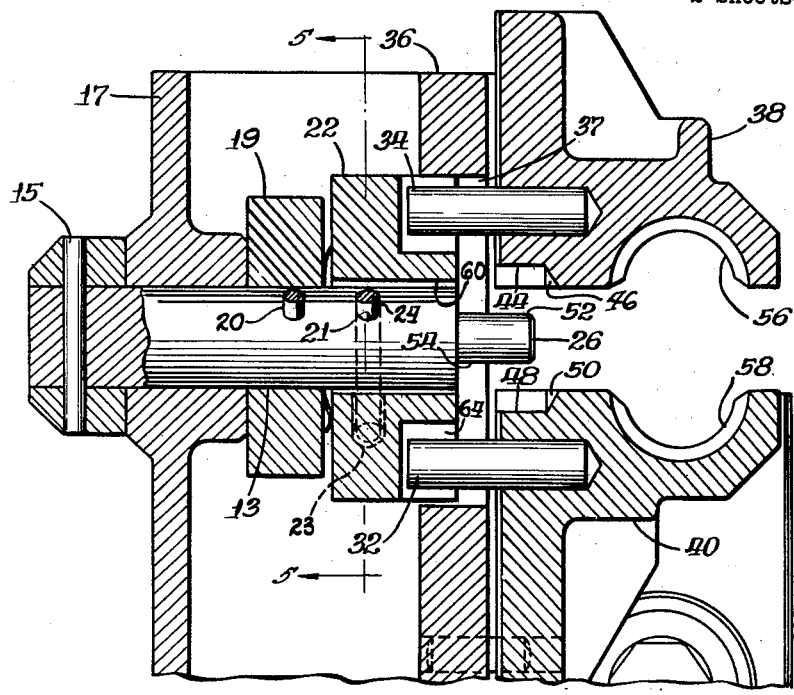
Fig. 3.
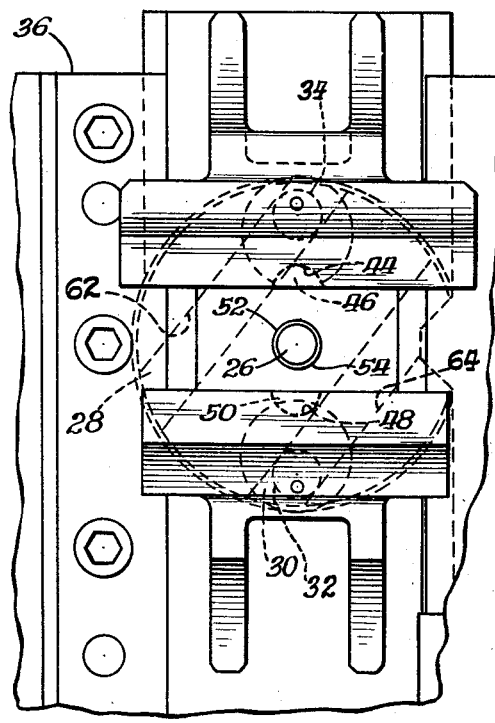
Fig. 4.
Fig. 5.
INVENTOR.
Stephen Emery Farekas
BY Walter J. Schlegel, Jr.
Atty.
Witness:
Robert A. Brown

3,162,073
HALF-NUT CLOSING ARRANGEMENT

Stephen Emery Farekas, South Bend, Ind., assignor to Amsted Industries Incorporated, Chicago, Ill., a corporation of New Jersey
Filed Oct. 18, 1962, Ser. No. 231,357
6 Claims. (Cl. 82—23)

This invention relates to machine tools, such as lathes, and more particularly to mechanisms associated with such machine tools and used for the transmission of power to component parts thereof.

In the past it has been common practice to provide various mechanical arrangements in machine tools for selectively engaging or disengaging power transmission driving members, such as a lead screw, to move other component parts thereon. However, such interlocking devices or enmeshing contrivances have proved not to be entirely satisfactory because varied control factors, such as manufacturing tolerances, are difficult to maintain. Practice has indicated that deviations in alignment between mating component members may result in poor quality of parts produced by the machine, and also may bring about greater than ordinary wear in the component parts of the machine itself.

Accordingly, an object of this invention is to provide a mechanism which will properly align moveable half-nuts when opening or closing upon a lead screw of a machine lathe.

Another object is to provide a mechanism which will maintain moveable half-nuts in a closed position of proper tolerance around a lead screw of a machine lathe.

A further object is to provide a mechanism which will cause moveable half-nuts to stop in proper juxtaposition with a lead screw of a machine lathe.

Other objects and advantages of this invention will become apparent when reference is made to the following written description and considered in conjunction with the accompanying drawings wherein:

FIGURE 3 is a sectional view of said half-nut mechanism taken on line 3—3 of FIGURE 2 to show inner detail;

FIGURE 4 is an end view of the half-nut mechanism in open position disengaged from the lead screw, and FIGURE 5 is a sectional view of the drive cam taken on line 5—5 of FIGURE 3.

Figure 1:
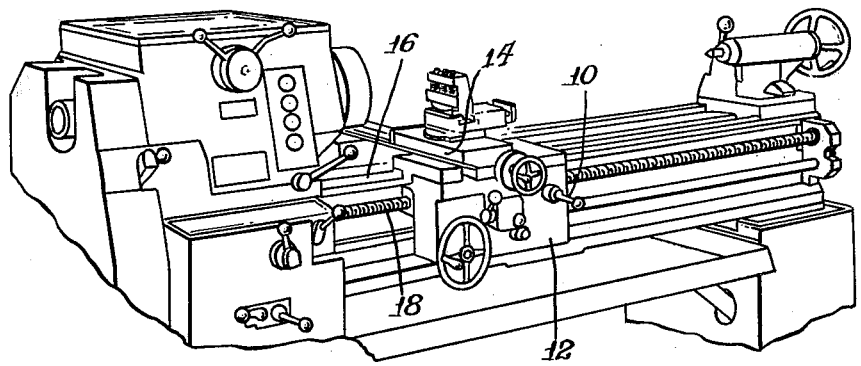
FIGURE 1 is a perspective view of a lathe of which the invention is a component part.

Referring to FIGURE 1, a handle 10 is rotatably journalled in an apron 12 suspended from a carriage 14 slideably mounted upon a bed 16. Said handle 10 is operatively connected to a half-nut mechanism, hereinafter described, said mechanism being engageable with and disengageable from a lead screw 18.

Figure 2:
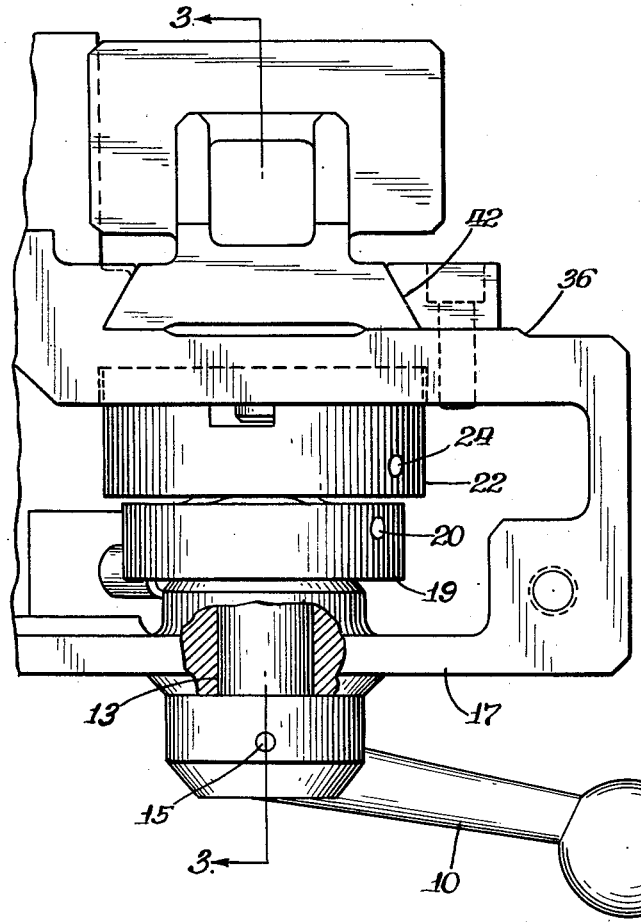
FIGURE 2 is a top plan view of an end portion of an apron member of said lathe showing the novel half-nut mechanism.

Referring to FIGURES 2, 3 and 4, handle 10 is secured upon a half-nut cam shaft 13 by a taper pin 15. Said cam shaft 13 extends laterally through an apron housing wall 17, and through a half-nut interlock disk 19 affixed on the shaft by a spring pin 20, and through a half-nut cam 22, loosely secured to the shaft by a spring pin 24. The shaft is reduced in diameter by a shoulder set-down to form a projecting cylindrical member 26, termed a positioning-stop guide pin.

Half-nut cam 22 is provided with a pair of similar grooves 28 and 30, to slideably receive elongated cylindrical members, termed half-nut drive pins 32 and 34. Half-nut drive pins 32 and 34 project through an opening 37 of the back apron wall 36, and are press-fitted or otherwise secured in recesses contained within half-nuts 40 and 38, respectively, which are moveably mounted within a dove-tail guide arrangement 42 upon the outer surface of said apron back wall 36.

In order to better explain the operation of the invention, let it first be assumed that the half-nuts are in an open position as illustrated by FIGURES 3 and 4, and are to be moved into engagement with the lead screw. When an upward force is exerted upon said handle 10 a transmission of torque is received by shaft 13 and is subsequently imparted to half-nut cam 22. Said cam is located circumferentially about the shaft, with clearance between an inner diameter 60 of the half-nut cam and the diameter of the shaft, and is positioned thereon by spring pin 24. The clearance as illustrated is exaggerated, by way of example, and is not drawn to scale. The pin 24 is secured rigidly in a complementary opening 21 of shaft 13 and is confined loosely within openings 23 of half-nut cam 22, one of said openings 23 being shown in FIGURE 3. Thus, when the shaft 13 is rotated, spring pin 24 rotates therewith. But half-nut cam 22 will not begin to rotate until spring pin 24 hase been rotated an amount sufficient to abut against the cam 22. As contact between spring pin 24 and the came 22 is attained, half-nut cam 22 begins to rotate, and its flat surfaces 62 and 64 by direct contact with the half-nut drive pins 32 and 34 cause vertical movement of the half-nuts, the bottom half-nut 40 moving upwardly, and the upper half-nut 38 moving downwardly. As said half-nuts move inwardly toward a closed position, the arcuate surface 44 of a semi-circular recess 46 in the upper half-nut 38 begins to achieve contact with the complementary upper peripheral surface 52 of positioning stop guide pin 26. Similarly, the arcuate surface 48 of a semi-circular recess 50 in the lower half-nut 40 achieves contact with the complementary lower peripheral surface 54 of positioning stop guide pin 26.

Said upper and lower half-nuts have now moved within said dove-tail guide arrangement 42 to a position where the internally formed threads 56 and 58 of said half-nuts define the same helix as that defined by the threads of the lead screw 18. The engagement of said half-nut threads in the same helix as defined by said lead screw threads is accomplished by having the longitudinal axis of said positioning stop guide pin intersect the longitudinal axis of said lead screw in a manner which guides and aligns the inwardly closing half-nut threads to mate properly with the rotating threads of the lead screw. The dove-tail guide arrangement is sufficiently loose to accommodate any movement necessary for precise alignment of the half-nuts by engagement of their recesses 44 and 48 with the complementary pin surfaces 52 and 54, respectively.

The positioning stop guide pin 26 provides the means to stop the inward travel of said half-nuts 38 and 40 in such a position that a predetermined distance is maintained between the root diameter of said half-nut threads and the crest diameter of said lead screw threads. As a result, said inward travel does not result in binding contact between said half-nut threads and said lead screw threads. Thus, no excessive wear or permanent damage may occur because of improper mating of said half-nut threads and said lead screw threads.

However, because of manufacturing tolerances which may be allowable during fabrication of the machine, the possibility may arise that one of the half-nuts could stop by final engagement with the guide pin 26 prior to final engagement of the other half-nut with the guide pin. Consequently, it is necessary to provide a means whereby the half-nut which has *not* stopped can be moved into final engagement with the guide pin and thereby align correctly with the other half-nut.

In order to effect this means and to ensure proper contact of both half-nuts with the guide pin, provision is made in the cam 22 to allow further translational movement of cam 22 after the first half-nut engages the guide pin. That is, the clearance between inner diameter 60 of cam 22 and the outer diameter of shaft 13, plus the clearance between openings 23 and pin 24 enable cam 22 to move in a manner generally radially of and eccentric to the axis of said shaft.

Therefore, assuming that upper half-nut 38 is the first one finally engaged with guide pin 26 and thus unable to move downwardly any further, additional rotation of shaft 13 will also cause cam 22 to rotate and upper surface 62 of recess 28 to slide in a generally clockwise direction about drive pin 34 as viewed in FIGURE 4. This sliding motion is not due only to a simple sliding movement of the cam, but also a rotation thereof generally about the centerline of shaft 13. That is, the motion of cam 22 can best be described as a combination of sliding motion and rotation about the point of tangency between upper surface 62 of recess 28 and drive pin 34. Consequently, this angular motion of cam 22 causes lower surface 64 of recess 30 to move generally clockwise, as viewed in FIGURE 4, thereby urging drive pin 32 upwardly toward guide pin 26. The looseness of the ends of pin 24 within openings 23 accommodates any relative movement therebetween. This continued rotation and sliding action of cam 22 continues until the lower half-nut 40 is also finally engaged with guide pin 26, at which time further rotation is precluded because of both half-nuts being finally engaged with guide pin 26. Thus proper engagement between both half-nuts and the lead screw is achieved and also the half-nuts have moved into proper alignment and spacing relative to each other.

I claim:

1. In a power driving arrangement, having a primary moving force, such as a lead screw, a slideably operated apron and carriage, an engagement means to receive and transmit said power from said lead screw to said apron, comprising a plurality of moveable threaded jaws to engage and disengage the threads of said lead screw, a cam operated means for opening and closing said threaded jaws, a rotatable shaft, a cam loosely mounted on said shaft, a cam driving means rigidly received through said rotatable shaft and loosely received in said cam, and means for guiding and stopping said jaws in proper threaded engagement with said lead screw.

2. In a machine having a lead screw and horizontally moveable apron, the combination of an upper vertically moveable, threaded jaw slideably supported by the apron, a lower vertically moveable, threaded jaw slideably supported by the apron, cam means connected to the jaws for actuation thereof, a shaft, said cam means being loosely pinioned to said shaft, and means to stop and guide the jaws in proper threaded engagement with said lead screw.

3. In a machine having a lead screw, a laterally moveable apron and carriage, a means supported by said apron for engagement and disengagement with said lead screw, said means comprising moveable half-nuts disposed to effect contact with said lead screw, an adjusting means for moving said half-nuts, driving means, said adjusting means being loosely fastened to said driving means, and a positioning stop guide to properly contact said half-nuts with said lead screw.

4. In combination, a lead screw, an apron having a back wall with an opening therethrough, a pair of half-nuts slideably mounted on said back wall for vertical and horizontal movement relative thereto, a shaft rotatably journalled in another wall of said apron, means on said shaft engaging oppositely facing surfaces of said other wall to limit movement of said shaft along its longitudinal axis, a half-nut cam having an opening within which said shaft is loosely received, lost-motion means connecting the shaft to the cam for permitting limited relative rotation therebetween on said axis, a pair of parallel grooves in said cam facing said half-nuts, means on respective half-nuts received within respective grooves for driving the half-nuts toward each other as the shaft is rotated in one direction about said axis and for driving the half-nuts away from each other as the shaft is rotated in the opposite direction about said axis, said shaft having a smaller-diameter, substantially cylindrical projection extending through said back wall opening, substantially cylindrical recesses in said half-nuts engageable with said projection to stop movement of the half-nuts toward each other and to align the half-nuts so that threads thereon define a helix substantially the same as a helix defined by threads on said lead screw, and means for rotating said shaft.

5. In a machine having a lead screw, a longitudinally moveable apron and carriage, means mounted on the apron for selectively engaging said lead screw, said means comprising an upper vertically moveable half-nut, a lower vertically moveable half-nut, both half-nuts being slideably confined in a dove-tail guide arrangement formed in a wall of said apron, a first drive pin rigidly secured to said upper half-nut, a second drive pin rigidly secured to said lower half-nut, a half-nut cam, said first drive pin being slideably confined in a first groove of the half-nut cam and said second drive pin being slideably confined in a second groove of the half-nut cam, a cam shaft, said half-nut cam being located circumferentially about the shaft and with an inner diameter providing clearance therefrom, a pin holding said cam to said shaft, said pin being rigidly secured at its approximate mid-section to said shaft and with its outer extremities loosely confined within recesses formed within said cam, a handle rigidly secured to said shaft, and a stop guide pin located within the path of travel of said half-nuts to align said half-nuts with each other.

6. In a machine having a lead screw, a longitudinally moveable apron and carriage, means mounted on the apron for selectively engaging said lead screw, said means comprising an upper vertically moveable half-nut, a lower vertically moveable half-nut, both half-nuts being slideably confined in a dove-tail guide arrangement formed in a wall of said apron, a first drive pin rigidly secured to said upper half-nut, a second drive pin rigidly secured to said lower half-nut, a half-nut cam, said first drive pin being slideably confined in a first groove of the half-nut cam and said second drive pin being slideably confined in a second groove of the half-nut cam, said first and second groove being formed parallel to each other and eccentrically disposed about the center line of the half-nut cam, a cam shaft, said half-nut cam being located circumferentially about the shaft and with an inner diameter providing clearance therefrom, a pin holding said cam to said shaft, said pin being rigidly secured at its approximate mid-section to said shaft and with its outer extremities loosely confined within recesses formed within said cam, a handle rigidly secured to said shaft, and a stop guide pin located within the path of travel of said half-nuts to align said half-nuts with each other.

References Cited in the file of this patent

UNITED STATES PATENTS

| | | |
|---|---|---|
| 136,184 | Russell | Feb. 25, 1873 |
| 144,861 | Payne | Nov. 25, 1873 |
| 232,436 | Barnes | Sept. 21, 1880 |
| 263,001 | Vinton | Aug. 22, 1882 |
| 643,194 | Moffatt | Feb. 13, 1900 |
| 2,543,967 | Heyer | Mar. 6, 1951 |
| 2,705,983 | Guadagna | Apr. 12, 1955 |